United States Patent [19]

Miyoshi et al.

[11] Patent Number: 5,077,250

[45] Date of Patent: * Dec. 31, 1991

[54] OLEFIN POLYMERIZATION CATALYST AND PROCESS FOR PRODUCING ETHYLENE COPOLYMERS

[75] Inventors: Yoshihiro Miyoshi; Hiroyuki Shiraishi; Takeshi Ebara; Toshio Sasaki, all of Ichihara; Kiyoshi Kawai, Chiba, all of Japan

[73] Assignee: Sumitomo Chemical Company, Limited, Osaka, Japan

[*] Notice: The portion of the term of this patent subsequent to Feb. 13, 2007 has been disclaimed.

[21] Appl. No.: 513,941

[22] Filed: Apr. 24, 1990

[30] Foreign Application Priority Data

May 8, 1989 [JP] Japan .................. 1-115672

[51] Int. Cl.$^5$ .............................. C08F 4/646
[52] U.S. Cl. .................. 502/116; 502/109; 502/126; 502/127; 502/112; 526/119
[58] Field of Search ............ 502/109, 116, 126, 127

[56] References Cited

U.S. PATENT DOCUMENTS

| | | | |
|---|---|---|---|
| 4,302,565 | 11/1981 | Goeke et al. | 502/110 X |
| 4,379,759 | 4/1983 | Goeke et al. | 502/167 |
| 4,672,050 | 6/1987 | Sasaki et al. | 502/116 |
| 4,900,706 | 2/1990 | Sasaki et al. | 502/116 |
| 4,916,099 | 4/1990 | Sasaki et al. | 502/116 X |

FOREIGN PATENT DOCUMENTS 56-115302 9/1981 Japan .

Primary Examiner—Patrick P. Garvin
Attorney, Agent, or Firm—Stevens, Davis, Miller & Mosher

[57] ABSTRACT

An olefin polymerization catalyst comprising:
(A) a solid catalyst component containing a trivalent titanium, which is represented by the composition formula $$Mg_m Ti(OR)_n X_p [ED]_q$$

(wherein R is a hydrocarbon group having 1 to 20 carbon atoms, X is a halogen, ED is a electron donative compound, and m, n, p and q are each a number satisfying $1 \leq m \leq 51$, $0 < n \leq 5$, $5 \leq p \leq 106$ and $0.2 \leq q \leq 2$) obtained by reducing a titanium compound represented by the general formula $Ti(OR^1)_a X_{4-a}$ (wherein $R^1$ is a hydrocarbon group having 1 to 20 carbon atoms, X is a halogen atom and a is a number satisfying $0 < a \leq 4$) with an organomagnesium compound in the presence of an organic silicon compound having Si—O bonds and an organic porous polymer, treating the resulting solid product with a ester compound and then reacting it with titanium tetrachloride or a mixture of titanium tetrachloride and a electron donative compound, and
(B) an organoaluminum compound and a process for producing an ethylene copolymer using the same.

20 Claims, 1 Drawing Sheet

FIG. I (A) TRANSITION METAL COMPONENT

- Ti(OR)$_n$X$_{4-n}$  (0 < n ≤ 4) —— CONTACT ——┐
- Si-O BOND CONTAINING ORGANIC Si COMPOUND ──┤
- ORGANIC POROUS POLYMER ─────────────────────┘
  → CONTACT ─┐
- ORGANO-Mg COMPOUND ─── REDUCTION ──┤
  → CONTACT ─┐
- ESTER COMPOUND ────────────────────┤
- ELECTRON DONATIVE COMPOUND ─ ─ ─ ─ ┤
  → CONTACT ─┐
- TiCl$_4$ ──────────────────────────┤
- ORGANO-Al COMPOUND ─ ─ ─ ─ ─ ─ ─ ─ ┤
- OLEFIN ─ ─ ─ ─ ─ ─ ─ ─ ─ ─ ─ ─ ─ ─ ┤
  → PRELIMINARY POLYMERIZATION
  → Mg$_m$Ti(OR)$_n$X$_p$[ED]$_q$
     (1 ≤ m ≤ 51,  5 ≤ p ≤ 106,
      0 < n ≤ 5,   0.2 ≤ q ≤ 2)
  → ETHYLENE COPOLYMER (B) ORGANOMETALLIC COMPONENT
- ORGANO-Al COMPOUND

OLEFIN POLYMERIZATION CATALYST AND PROCESS FOR PRODUCING ETHYLENE COPOLYMERS

BACKGROUND OF THE INVENTION

1. Field of the Invention

This invention relates to a catalyst for olefin polymerization and a process for producing ethylene copolymers. More particularly, this invention relates to an olefin polymerization catalyst comprising a solid catalyst component exhibiting a very high activity per transition metal in gas phase polymerization process and slurry polymerization process, as well as to a process for producing ethylene copolymers having a narrow molecular weight distribution and a small content of low molecular weight component by the use of said catalyst. Further, this invention relates also to a process for producing ethylene copolymers having a high bulk density, a low fine powder content and a good flow property while controlling the particle shape of solid catalyst component quite excellently.

It is needless to say that a high catalyst activity (quantity of polymerization per unit quantity of catalyst), particularly a high activity per transition metal, is quite valuable industrially because it makes unnecessary the removal of catalyst residue from the polymer after polymerization and thereby simplifies the production process of polymer.

On the other hand, it is desirable to minimize the adhesion of polymer to polymerization reactor as possible because the adherent polymer makes various troubles on the operations and thereby lowers the efficiency of work. Thus, a high bulk density, a narrow particle size distribution and a good flow property of polymer powder are desirable from the viewpoint of stability and efficiency of operation. Further, molecular weight distribution and existence (or nonexistence) of low molecular weight component are factors governing transparency, impact resistance and blocking property of processed articles, and a process capable of producing an ethylene copolymer having a narrow molecular weight distribution and a small content of low molecular weight component is desirable.

2. Description of the Related Art

In the recent years, catalyst made of a transition metal compound supported on a carrier such as titanium tetrachloride and the like were developed (Belgian Patent Application No. 759,601, Japanese Patent Kokoku (Post-Exam Publn) No. Sho 47-46269, Japanese Patent Kokoku No. Sho 47-26,383, etc.). Although this type of catalysts are higher in polymerizing activity than prior catalysts, they are yet insufficient in the point of catalyst activity per transition metal.

On the other hand, as a catalyst system made from a solid product prepared by reducing a titanium compound with organomagnesium, the solid catalyst component composed of Grignard reagent and titanium tetrachloride or alkoxy-containing titanium halide (Japanese Patent Kokai (Laid-Open) No. Sho 46-4,391, Japanese Patent Kokoku No. Sho 47-40,959, Japanese Patent Kokoku No. Sho 50-30,102, etc.) and the solid catalyst component prepared by reacting Grignard reagent and alkoxy-containing titanium halide and treating the reaction product with titanium tetrachloride (Japanese Patent Kokoku No. Sho 57-24,361, Japanese Patent Kokai No. Sho 56-115,302, etc.) have been reported. However, these catalysts are yet insufficient in catalyst activity per transition metal and particle characteristics of solid catalyst component.

On the other hand, there have been disclosed a few catalyst components supported on porous inorganic carriers (Japanese Patent Kokai No. Sho 54-148,093, 56-24,409, 58-179,207, etc.). However, they are yet insufficient in the point of catalyst activity and adhesion to polymerization reactor.

SUMMARY OF THE INVENTION

In the above-mentioned status of things, the problem to be solved by this invention, namely the object of this invention, consists in providing a solid catalyst component having so high a catalyst activity per transition metal as to make the removal of catalyst residue unnecessary and a process for producing an ethylene copolymer having a narrow molecular weight distribution, a small content of low molecular weight component, a high bulk density, a small content of fine powder and a good flow property by the use of said catalyst.

This invention provides an olefin polymerization catalyst comprising:

(A) a solid catalyst component containing a tri-valent titanium, which is represented by the composition formula $$Mg_m Ti(OR)_n X_p [ED]_q$$

(wherein R is a hydrocarbon group having 1 to 20 carbon atoms, X is halogen, ED is an electron-donative compound, and m, n, p and q are each a number satisfying $1 \leq m \leq 51$, $0 < n \leq 5$, $5 \leq p \leq 106$ and $0.2 \leq q \leq 2$), obtained by reducing a titanium compound represented by the general formula $$Ti(OR^1)_a X_{4-a}$$

(wherein $R^1$ is a hydrocarbon group having 1 to 20 carbon atoms, X is a halogen atom and a is a number satisfying $0 < a \leq 4$), with an organomagnesium compound in the presence of an organic silicon compound having Si—O bond and an organic porous polymer, treating the resulting solid product with an ester compound and then reacting it with titanium tetrachloride or a mixture of titanium tetrachloride and an electron donative compound, and (B) an organoaluminum compound, As well as a process for producing an ethylene copolymer comprising copolymerizing ethylene and at least one alpha-olefin having 3 or more carbon atoms by the use of said polymerization catalyst.

According to the process of this invention for producing ethylene copolymer, the quantity of residual catalyst in the formed polymer is so small that the step for removal of catalyst can be omitted, owing to the high catalyst activity per transition metal. Further, adhesion of polymer to polymerization reactor is small at the time of polymerization, and the resulting polymer has a narrow particle size distribution, a nearly spherical or drawn spherical shape, a high bulk density and a good flow property, so that the step for pelletization can be omitted. Thus, the process of this invention is quite excellent in efficiency of polymerization and workability. Further, it enables to produce a copolymer having a narrow molecular weight distribution and having a small content of low molecular weight component.

BRIEF DESCRIPTION OF THE DRAWING

FIG. 1 is a flow chart diagram facilitating understanding of this invention. This flow chart is a mere typical example of embodiment of this invention and by no means limits this invention.

DETAILED DESCRIPTION OF THE INVENTION

Next, this invention will be illustrated below concretely.

(a) Titanium compound

The titanium compound used in this invention is represented by the following general formula:

$$Ti(OR^1)_aX_{4-a}$$

wherein $R^1$ represents a hydrocarbon group having 1 to 20 carbon atoms, X represents a halogen atom, and a represents a number satisfying $0 < a \leq 4$.

Concrete examples of $R^1$ include alkyl groups such as methyl, ethyl, propyl, iso-propyl, butyl, isobutyl, amyl, iso-amyl, hexyl, heptyl, octyl, decyl, dodecyl and the like; aryl groups such as phenyl, cresyl, xylyl, naphthyl and the like; cycloalkyl groups such as cyclohexyl, cyclopentyl and the like; allyl groups such as propenyl and the like; aralkyl groups such as benzyl and the like; etc.

Among the above-mentioned groups, alkyl groups having 2 to 18 carbon atoms and aryl groups having 6 to 18 carbon atoms are preferable, and straight chain alkyl groups having 2 to 18 carbon atoms are particularly preferable. It is also possible to use titanium compounds having two or more different $OR^1$ groups.

Examples of the halogen atom represented by X include chlorine, bromine, iodine and the like, among which chlorine gives a particularly good result.

In the titanium compound represented by $Ti(OR^1)_aX_{4-a}$, the value of a satisfies $0 < a \leq 4$, preferably $2 \leq a \leq 4$, and particularly $a = 4$.

As the method for synthesizing the compound represented by $Ti(OR^1)_aX_{4-a}$ ($0 < a \leq 4$), any known methods can be employed. For example, a method of reacting $Ti(OR^1)_4$ and $TiX_4$ a necessary ratio, or a method of reacting $TiX_4$ and a corresponding alcohol at a necessary ratio can be adopted.

(b) Organic silicon compound having Si—O bond

The organic silicon compounds having Si—O bond used in this invention are those represented by the following general formulas:

$$Si(OR^3)_bR^4_{4-b}$$

$$R^5(R^6_2SiO)_cSiR^7_3$$

$$(R^8_2SiO)_d$$

wherein $R^3$ represents a hydrocarbon group having 1 to 20 carbon atoms, $R^4$, $R^5$, $R^6$, $R^7$ and $R^8$ each represents a hydrocarbon group having 1 to 20 carbon atoms or a hydrogen atom, b is a number satisfying $0 < b \leq 4$, c is an integer of 1 to 1,000, and d is an integer of 2 to 1,000

Concrete examples of the organic silicon compound include the followings:

tetramethoxysilane, dimethyldimethoxysilane, tetraethoxysilane, triethoxyethylsilane, diethoxydiethylsilane, ethoxytriethylsilane, tetra-iso-propoxysilane, di-iso-propoxy-di-iso-propylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane, phenylhydropolysiloxane, and the like.

Among these organic silicon compounds, alkoxysilane compounds represented by general formula $Si(OR^3)_bR^4_{4-b}$ are preferable, and those wherein $1 \leq b \leq 4$ are more preferable, and tetraalkoxysilane compounds wherein $b = 4$ are particularly preferable.

(c) Organomagnesium compounds

Next, as the organomagnesium compound, any forms of organomagnesium compounds having magnesium-carbon bond can be used. Particularly, Grignard compounds represented by general formula $R^9MgX$ wherein $R^9$ represents a hydrocarbon group having 1 to 20 carbon atoms and X represents a halogen, and dialkylmagnesium compounds or diarylmagnesium compounds represented by general formula $R^{10}R^{11}Mg$ wherein $R^{10}$ and $R^{11}$ each represents a hydrocarbon group having 1 to 20 carbon atoms are preferably usable. Here, $R^9$ and $R^{10}$ may be identical or different, and they represent alkyl, aryl, aralkyl or alkenyl group having 1 to 20 carbon atoms such as methyl, ethyl, propyl, iso-propyl, butyl, sec-butyl, tert-butyl, amyl, iso-amyl, hexyl, octyl, 2-ethylhexyl, phenyl, benzyl and the like.

Concrete examples of said Grignard compound include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, iso-amylmagnesium chloride, phenylmagnesium chloride, phenylmagnesium bromide and the like. Concrete examples of the compound represented by $R^{10}R^{11}Mg$ include diethylmagnesium, dipropylmagnesium, diisopropylmagnesium, dibutylmagnesium, di-sec-bytylmagnesium, di-tert-butylmagnesium, butyl-sec-butylmagnesium, diamylmagnesium, diphenylmagnesium, and the like.

In the synthesis of the above-mentioned organomagnesium compounds, the following ethereal solvents can be used: diethyl ether, dipropyl ether, di-iso-propyl ether, dibutyl ether, di-iso-butyl ether, diamyl ether, di-iso-amyl ether, dihexyl ether, dioctyl ether, diphenyl ether, dibenzyl ether, phenetole, anisole, tetrahydrofuran, tetrahydropyran, and the like. Hydrocarbon solvents such as hexane, heptane, octane, cyclohexane, methylcyclohexane, benzene, toluene, xylene and the like and solvent mixtures consisting of these ethereal solvents and hydrocarbon solvents are also usable. The organomagnesium compound is preferably used in a state of an ethereal solution. For this purpose, ether compounds having 6 or more carbon atoms in their molecule or ether compounds having a cyclic structure are used.

From the viewpoint of catalytic performances, it is particularly preferable to use a Grignard compound represented by $R^9MgCl$ in the state of an ether solution.

Hydrocarbon-soluble complexes formed between the above-mentioned organomagnesium compounds and organometallic compounds are also usable. As examples of the organometallic compound, organic compounds of Li, Be, B, Al and Zn can be referred to.

(d) Organic porous polymers

As examples of the organic porous polymer carrier used in this invention, porous polymer beads made of polystyrene type, polyacrylic ester type, polymethacrylic ester type, polyacrylonitrile type, polyvinyl chloride type and polyolefin type of polymers can be referred to. Concrete examples of said polymer include polystyrene, styrene-divinylbenzene copolymer, styrene-N,N'-alkylene dimethacrylamide copolymer, styrene-ethylene glycol-di(methyl methacrylate) copolymer, polymethyl acrylate, polyethyl acrylate, methyl acrylate-divinylbenzene copolymer, ethyl acrylate-divinylbenzene copolymer, polymethyl methacrylate, methyl methacrylatedivinylbenzene copolymer, polyethylene glycol-di(methyl methacrylate), polyacrylonitrile, acrylonitriledivinylbenzene copolymer, polyvinyl chloride, polyvinylpyrrolidine, polyvinylpyridine, ethylvinylbenzene-divinylbenzene copolymer, polyethylene, ethylenemethacrylate copolymer, polypropylene, and the like.

Among these organic porous polymer carriers, porous polymer beads of polystyrene type, polyvinyl chloride type, polyolefin type and polyacrylonitrile type are preferable, and polystyrene, styrene-divinylbenzene copolymer and polyvinyl chloride are more preferable.

Mean particle diameter of the organic porous polymer carrier is 5 to 1,000 microns, preferably 10 to 500 microns, and particularly 15 to 200 microns. Its pore volume in the pore radius range of 100 to 5,000 angstroms is 0.1 cc/g or above, preferably 0.2 cc/g or above, and particularly 0.3 cc/g or above. If pore volume of the organic porous polymer carrier is too small, catalyst component cannot be impregnated thereinto effectively. Even if pore volume of the organic porous polymer carrier is 0.1 cc/g or above, catalyst component cannot be impregnated effectively if said pore radius is out of the range of 100 to 5,000 angstroms.

(e) Ester compound

As the ester compound used in this invention, esters of mono- and poly-basic carboxylic acids including aliphatic carboxylic esters, olefinic carboxylic esters, alicyclic carboxylic esters and aromatic carboxylic esters are used. Concrete examples of the ester compound include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate dibutyl maleate, diethyl itaconate, dibutyl itaconate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate, and the like.

Among these ester compounds, olefinic carboxylic esters such as methacrylic esters and maleic ester and phthalic esters are preferable, and phthalic diethers are particularly preferable.

(f) Electron donative compound

As the electron donative compound of this invention, ester compounds, ether compounds, ketone compounds etc. are used.

As the ester compound, esters of mono- and poly-basic carboxylic acids including aliphatic carboxylic esters, olefinic carboxylic esters, alicyclic carboxylic esters and aromatic carboxylic esters are used. Concrete examples of the ester compound include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, dipropyl phthalate, diisopropyl phthalate, dibutyl phthalate, diisobutyl phthalate, diheptyl phthalate, dioctyl phthalate, diphenyl phthalate, and the like.

Among these ester compounds, olefinic carboxylic esters such as methacrylic esters and maleic ester and phthalic esters are preferable, and phthalic diesters are particularly preferable.

As the ether compound, dialkyl ethers such as diethyl ether, dipropyl ether, diisopropyl ether, dibutyl ether, diamyl ether, di-iso-amyl ether, dineopentyl ether, dihexyl ether, dioctyl ether, methyl butyl ether, methyl iso-amyl ether, ethyl iso-butyl ether and the like are preferable.

Among them, dibutyl ether and di-iso-amyl ether are particularly preferable.

As the ketone compound, acetone, methyl ethyl ketone, diethyl ketone, acetophenone, propiophenone, benzophenone, cyclohexanone, 2,4-pentadione, 1-phenyl-1,3-butanedione and the like can be referred to.

These electron donative compounds may be used either alone or in the form of a mixture with other compound.

(g) Synthesis of titanium catalyst component

The titanium catalyst component of this invention is synthesized by reducing a titanium compound represented by general formula $Ti(OR^1)_aX_{4-a}$ with an organomagnesium compound in the presence of an organic silicon compound having Si-0 bond and an organic porous polymer to obtain a solid product, and thereafter treating the resulting solid product with an ester compound and then with titanium tetrachloride or a mixture of titanium chloride and electron donative compound. At this time, it is preferable that, upon the reduction, a solid is deposited on the particles of organic porous polymer and the solid product retains the shape of organic porous polymer without formation of fine powder.

As the method for reducing a titanium compound with an organomagnesium compound, addition of an organomagnesium compound to a mixture of a titanium compound, an organic silicon compound and an organic porous polymer can be referred to.

Preferably, the titanium compound, organic silicon compound and organic porous polymer are dissolved or diluted with an appropriate solvent and then put to use.

As said solvent, aliphatic hydrocarbons such as hexane, heptane, octane, decane and the like, aromatic hydrocarbons such as toluene, xylene and the like, alicyclic hydrocarbons such as cyclohexane, methylcyclohexane, decalin and the like and ethers such as diethyl ether, dibutyl ether, diisoamyl ether, tetrahydrofuran and the like can be used.

Temperature of the reduction is in the range of −50° C. to 70° C., preferably −30° C. to 50° C., and particularly −25° C. to 35° C.

Although period of the dropping is not critical, it is usually about 30 minutes to 6 hours. After completion of the reduction, a post reaction may be effected additionally at a temperature of 20° C. to 120° C.

The organic silicon compound is used in an amount of 1 to 50, preferably 1 to 30, and particularly 3 to 25, as expressed in terms of atomic ratio of silicon atom to titanium atom (Si/Ti).

The organomagnesium compound is used in an amount of 0.1 to 10, preferably 0.2 to 5.0, and particularly 0.5 to 2.0, as expressed in terms of atomic ratio of the sum of titanium atom and silicon atom to magnesium atom ((Ti+Si)/Mg). That is, the quantities of titanium compound, organic silicon compound and organomagnesium compound may be decided so that the value of m expressing molar ratio Mg/Ti in the composition formula $Mg_mTi(OR)_nX_p(ED)_q$ of the titanium catalyst component comes to 1 to 51, preferably 2 to 31 and particularly 4 to 26.

The amount of the organic porous polymer is 20 to 90% by weight, preferably 30 to 80% by weight, as expressed in terms of its proportion in solid product.

The solid product obtained by the reduction is separated from liquid and several times washed with an inert hydrocarbon solvent such as hexane, heptane or the like.

The solid product thus obtained contains trivalent titanium, magnesium and hydrocarbyloxy group and generally shows an amorphous or very weak crystalline character. Amorphous structure is particularly preferable from the viewpoint of catalyst performances.

Next, the solid catalyst obtained above is treated with an ester compound.

The ester compound is used in an amount of 0.1 to 50 moles, preferably 0.3 to 20 moles, and particularly 0.5 to 10 moles, per one mole of titanium atom in the solid product. In other words, the amount of ester compound may be decided so that the value of q in the composition formula $Mg_mTi(OR)_nX_p(ED)_q$ of titanium catalyst component expressing the molar ratio (electron donative compound)/Ti comes to 0.2 to 2.

The amount of ester compound per one mole of magnesium atom in the solid product is 0.01 to 1.0 mole, and preferably 0.03 to 0.5 mole.

The treatment of the solid product with ester compound can be performed by any methods capable of contacting both the materials, such as slurry method, mechanical pulverization using ball mill, etc. However, mechanical pulverization forms a large amount of fine powder in the solid catalyst component and thereby broadens the particle size distribution. Therefore, it is undesirable from the industrial point of view. Preferably, both the materials should be contacted in the presence of a diluent.

As the diluent, aliphatic hydrocarbons such as pentane, hexane, heptane, octane and the like, aromatic hydrocarbons such as benzene, toluene, xylene and the like, alicyclic hydrocarbons such as cyclohexane, cyclopentane and the like, and halogenated hydrocarbons such as 1,2-dichloroethane, monochlorobenzene and the like can be used.

The diluent is used in an amount of 0.1 ml to 1,000 ml, preferably 1 ml to 100 ml, per 1 g of the solid product. Temperature of the treatment is −50° C. to 150° C., and preferably 0° C. to 120° C. Period of the treatment is 10 minutes or longer, and preferably 30 minutes to 3 hours. After completion of the treatment, the mixture is allowed to stand to separate the solid from liquid, after which the solid is several times washed with inert hydrocarbon solvent to obtain an ester-treated solid.

The solid product obtained in the above-mentioned manner is then treated with titanium tetrachloride. This treatment may be carried out in the presence of an electron donative compound, if desired. For example, the treatment may be carried out with a mixture of an ether compound and titanium tetrachloride or with a mixture of an ether compound, an ester compound and titanium tetrachloride.

The treatment of solid product using titanium tetrachloride is preferably carried out in the state of a slurry. As the solvent used for formation of slurry, aliphatic hydrocarbons such as pentane, hexane, heptane, octane, decane and the like, aromatic hydrocarbons such as toluene, xylene and the like, alicyclic hydrocarbons such as decalin, cyclohexane, methylcyclohexane and the like, and halogenated hydrocarbons such as dichloroethane, trichloroethane, trichloroethylene, monochlorobenzene, dichlorobenzene, trichlorobenzene and the like can be referred to.

Concentration of the slurry is 0.05 to 0.5 g solid/ml solvent, and particularly 0.1 to 0.3 g solid/ml solvent.

Temperature of the reaction is 30° C. to 150° C., preferably 45° C. to 120° C., and particularly 60° C. to 100° C.

Though period of the reaction is not critical, it is usually 30 minutes to 6 hours.

The method for adding solid product and titanium tetrachloride may be any of the method of adding titanium tetrachloride to solid product and the method of adding solid product into a solution of titanium tetrachloride.

In the method of adding electron donative compound and titanium tetrachloride to solid product, a method of previously mixing an electron donative compound with titanium tetrachloride and thereafter adding the resulting mixture to solid product and a method of simultaneously adding an electron donative compound and titanium tetrachloride to solid product are particularly preferable.

The reaction between solid product and titanium tetrachloride may be repeated twice or more.

The amount of titanium tetrachloride is 1 to 1,000 moles, preferably 3 to 500 moles and particularly 10 to 300 moles per one mole of titanium atom contained in the solid product. Per one mole of ether compound, the amount of titanium tetrachloride is 1 to 100 moles, preferably 1.5 to 75 moles, and particularly to 2 to 50 moles.

The amount of electron donative compound is 0.01 to 100 moles, preferably 0.05 to 50 moles, and particularly 0.1 to 20 moles, per one mole of titanium atom contained in the solid product. In other words, the quantities of titanium tetrachloride and electron donative compound may be decided so that the value of n expressing molar ratio (RO group)/Ti in the composition formula of titanium catalyst component $Mg_mTi(OR)_nX_p(ED)_q$ comes to 0-5 and the value of q expressing molar ratio (electron donative compound)/Ti in the same composition formula as above comes to 0.2-2.

The trivalent titanium-containing solid catalyst component obtained by the above-mentioned method is separated from liquid, several times washed with inert hydrocarbon solvent such as hexane, heptane and the like and then put to use in polymerization.

According to another allowable embodiment, the trivalent titanium-containing solid catalyst component is separated from liquid, washed at least once with a large quantity of halogenated hydrocarbon solvent such as monochlorobenzene or the like or an aromatic hydrocarbon solvent such as toluene, xylene or the like at a temperature of 50° C. to 120° C., and then washed several times with an aliphatic hydrocarbon solvent such as hexane or the like, after which it is put to use in polymerization.

The solid obtained in the above-mentioned manner is used as a titanium catalyst component.

(h) Organoaluminum compound

The organoaluminum compound used in this invention in combination with the above mentioned titanium catalyst component has at least one Al-carbon bond in its molecule.

Its typical examples are as follows:

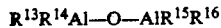

wherein $R^{12}$, $R^{13}$, $R^{14}$, $R^{15}$ and $R^{16}$ each represents a hydrocarbon group having 1 to 8 carbon atoms, Y represents halogen, hydrogen or alkoxy group, and Y represents a number satisfying $2 \leq \gamma \leq 3$.

Concrete examples of the organoaluminum compound include trialkylaluminums such as triethylaluminum, triisobutylaluminum, trihexylaluminum and the like, dialkylaluminum hydrides such as diethylaluminum hydride, diisobutylaluminum hydride and the like, dialkylaluminum halide such as diethylaluminum chloride and the like, mixture of trialkylaluminum and dialkylaluminum halide, and alkylalumoxanes such as tetraethyldialumoxane, tetrabutyldialumoxane and the like.

Among these organoaluminum compounds, trialkylaluminum, mixtures of trialkylaluminum and dialkylaluminum halide and alkylalumoxanes are preferable, and triethylaluminum, triisobutylaluminum, mixture of triethylaluminum and diethylaluminum chloride, and tetraethyldialumoxane are particularly preferable.

The amount of the organoaluminum compound may be appropriately selected in a wide range. For example, it can be selected from a range of 1 to 1,000 moles and preferably 5 to 600 moles, per one mole of titanium atom in the solid catalyst.

(i) Preliminary polymerization

Prior to the copolymerization of ethylene, the titanium catalyst component of this invention may be subjected to a preliminary polymerization. The preliminary polymerization is carried out by contacting it with the above-mentioned organoaluminum compound and an olefin. As the olefin, ethylene, propylene, butene-1 and the like can be used. The preliminary polymerization may be any of homopolymerization and copolymerization.

The preliminary polymerization may be carried out in the presence of an electron donative compound, hydrogen and the like in order to obtain a highly crystalline prepolymer. As the electron donative compound used for this purpose, organic compounds having Si—OR bond, wherein R represents a hydrocarbon group having 1 to 20 carbon atoms, are preferable.

Preferably, the titanium catalyst component of this invention is subjected to preliminary polymerization in the state of a slurry. As the solvent used for forming the slurry, aliphatic hydrocarbons such as butane, pentane, hexane, heptane and the like and aromatic hydrocarbons such as toluene, xylene and the like can be referred to.

Concentration of the slurry is preferably 0.001 to 0.5 g solid/ml solvent, and particularly 0.01 to 0.3 g solid/ml solvent. Preferably, an organoaluminum compound is used at this time in such an amount as to give an Al/Ti molar ratio of 0.1 to 100, and particularly to 10.

Temperature of the preliminary polymerization is preferably −30° C. to 80° C., and particularly −10° C. to 50° C.

Preferably, the preliminary polymerization is carried out so as to form 0.1 to 100 g of polymer, particularly 0.5 to 50 g of polymer, per one gram of solid catalyst component.

(j) Production of ethylene copolymer

This invention provides a process for copolymerizing ethylene and at least one alpha-olefin(s) by the use of an organoaluminum compound and the above-mentioned titanium catalyst component or the titanium catalyst component having been subjected to preliminary polymerization.

Now, the embodiment of the polymerization will be mentioned below more concretely.

The method for feeding titanium catalyst component and organoaluminum compound into polymerization reactor is not critical, so far as it is carried out in a moisture-free state in the presence of an inert gas such as nitrogen, argon gas or the like or in the presence of hydrogen, ethylene, propylene or the like.

The titanium catalyst component and the organoaluminum compound may be fed either separately or after a previous mutual contact.

The polymerization reaction may be carried out according to known processes such as usual gas phase polymerization, slurry polymerization and the like.

Conditions of the polymerization are as follows. Thus, the polymerization is preferably carried out at a temperature not higher than the temperature at which the polymer melts, preferably 20° C. to 100° C. and particularly 40° C. to 90° C., under a pressure ranging from ordinary pressure to 40 kg/cm². Further, in the copolymerization process, hydrogen may be added to the polymerization system for the purpose of regulating the melt flow property of the final product. The polymerization process may be carried out according to any of continuous system and batch system.

This invention can be applied to alpha-olefins having 3 or more carbon atoms. More concretely speaking, the alpha-olefins to which this invention is applicable include propylene, butene-1, pentene-1, hexene-1, 3-methyl-pentene-1, 4-methylpentene-1 and the like, though this invention is by no means limited by these olefins. According to the polymerization process of this invention, an ethylene copolymer can be produced by contacting a mixture of ethylene and at least one alpha-olefin with the catalyst.

DESCRIPTION OF THE PREFERRED EMBODIMENT

Next, the process of this invention will be illustrated below in more detail with reference to the following examples. This invention is by no means limited by these examples.

In the examples, properties of polymer were measured by the following methods.

Density was determined according to JIS K-6760.

Melt index was measured at 190° C. according to JIS K-6760.

Bulk density was measured according to JIS K-6721.

Melt flow rate (MFR) was adopted as the measure of melt flow property. Herein, MFR is expressed by the ratio of melt flow at a load of 21.60 kg to melt flow at a load of 2.160 kg, both measured according to ASTM 1238-57T (measurement of melt index MI):

$$MFR = \frac{\text{Melt flow at a load of 21.60 kg}}{\text{Melt flow at a load of 2.160 kg}}$$

It is known that a broader molecular weight distribution generally gives a greater value of MFR.

EXAMPLE 1

(A) Synthesis of Organomagnesium Compound

After replacing inner atmosphere of a flask having an capacity of one liter and equipped with a stirrer, a reflux condenser, a dropping funnel and a thermometer with argon gas, 32.0 g of sliced metallic magnesium for Grignard reaction was thrown into the flask.

After charging 120 g of butyl chloride and 500 ml of dibutyl ether into the dropping funnel, about 30 ml of their mixture was dropped onto the magnesium in the flask to start a reaction. After start of the reaction, the dropping was continued at 50° C. over a period of 4 hours. After completing the dropping, the reaction was continued for an additional one hour at 60° C. Then, the reaction mixture was cooled to room temperature and solid matter was filtered off.

The butylmagnesium chloride dissolved in the dibutyl ether was hydrolyzed with 1 N sulfuric acid and back titrated with 1 N aqueous solution of sodium hydroxide to determine its concentration, by using phenolphthalein as indicator. As the result, its concentration was 2.0 moles/liter.

(B) Synthesis of Solid Product

After replacing inner atmosphere of a flask having an capacity of 1,000 ml and equipped with a stirrer and a dropping funnel with argon gas, 51.0 g of a styrene-divinylbenzene copolymer (its mean particle diameter was 50 microns, and its pore volume (cc/g) in the pore radius range of 100 to 5,000 angstroms (hereinafter, referred to as dVp) was 1.05 cc/g as measured with porosimeter) which had been dried at 80° C. for 5 hours under reduced pressure, 250 ml of heptane, 4.5 g (13.2 millimoles) of tetrabutoxytitanium and 47.5 g (228 millimoles) of tetraethoxysilane were charged into the flask and stirred at 30° C. for 45 minutes.

Then, 120 ml of the organomagnesium compound synthesized in (A) was dropped from the dropping funnel over a period of 45 minutes, while maintaining the inner temperature of the flask at 5° C. After dropping it, the resulting mixture was stirred at 5° C. for 45 minutes and then at 30° C. for 45 minutes, and then it was twice washed with each 300 ml portion of hexane and dried under reduced pressure to obtain 85.2 g of a brown colored solid product.

(C) Synthesis of Solid Catalyst Component

After replacing inner atmosphere of a flask having a capacity of 500 ml with argon gas, 57.3 g of the solid product synthesized in the reduction (B), 191 ml of toluene and 16.0 ml (60 millimoles) of diisobutyl phthalate were charged into the flask and reacted at 95° C. for 30 minutes.

After the reaction, solid matter was separated from liquid and twice washed with each 200 ml portion of toluene.

After washing it, 191 ml of toluene, 1.2 ml (7 millimoles0 of butyl ether and 17.2 ml (156 millimoles) of titanium tetrachloride were added to the flask and reacted at 95° C. for 3 hours. After the reaction, solid matter was separated from liquid at 95° C. and twice washed with each 200 ml portion of toluene at that temperature.

After additionally washing it with each 200 ml portion of hexane, it was dried under reduced pressure to obtain 52.8 g of a brown colored solid catalyst component.

Composition of the cataly;st component contained in the organic porous polymer carrier was as follows:

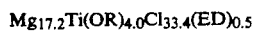

$Mg_{17.2}Ti(OR)_{4.0}Cl_{33.4}(ED)_{0.5}$ (D) Polymerization

After thoroughly replacing inner atmosphere of an autoclave having a capacity of 5 liters and equipped with a stirrer with argon gas, 200 g of a sufficiently dried high density polyethylene was fed as a dispersant. After reducing the inner pressure, 22 g of butene-1 was fed and heated to 80° C. Then, hydrogen was fed until the total pressure reached 2.3 kg/cm$^2$, and then ethylene was fed until total pressure reached 8.8 kg/cm$^2$. Then, 12.1 mg of the catalyst component obtained in (C), 2.5 millimoles of triethylaluminum and 15 ml of hexane were fed under a pressure of argon to start a polymerization. Thereafter, a gas phase polymerization was continued at 80° C. for 2 hours at a constant total pressure while continuously feeding ethylene/butene-1 mixture gas (ethylene content 92% by weight).

After completion of the polymerization, the unreacted monomers were purged and the high density polyethylene used as dispersant was removed to obtain 102.1 g of a polymer which was free from fine powder and coarse particle and had good powder characteristics. No adhesion of polymer was observed at all on the inner wall of autoclave and stirrer.

Formation (grams) of polymer per 1 gram of titanium atom, i.e. catalyst activity, was 1,690,000 g polymer/g titanium atom. Density of this polymer was 0.921, its MI was 0.98 g/10 minutes, its MFR was 27.5, and its bulk density was 0.46 g /cm$^3$. Proportion of cold xylene-soluble fraction in the total polymer yield (hereinafter referred to as CXS) was 6.4%. The polymer powder had a nearly spherical shape, a narrow particle size distribution and a good flow property. No fine polymer having a size of 125 microns or below was formed at all.

COMPARATIVE EXAMPLE 1

A polymerization was carried out in the same manner as in Example 1 (D), except that 350 mg of the solid product obtained in Example 1 (B) (composition formula $Mg_{17.9}Ti(OR)_{20.9}Cl_{17.9}(ED)_{0.4}$) was used as catalyst component.

As the result, only a small quantity of polymer was obtained.

COMPARATIVE EXAMPLE 2

(A) Synthesis of Solid Product

After replacing inner atmosphere of a flask having a capacity of 300 ml and equipped with a stirrer and a dropping funnel with argon gas, 20.1 g of the same styrene-divinylbenzene copolymer as in Example 1 (B) which had been dried at 80° C. for one hour under reduced pressure, 100 ml of heptane and 7.2 g (21.2 millimoles) of tetrabutoxytitanium were charged into the flask and stirred at 30° C. for 45 minutes.

Then, 10.6 ml of the organomagnesium compound synthesized in Example 1 (A) wa dropped from the dropping funnel over a period of 20 minutes, while maintaining the inner temperature of the flask at 5° C. After dropping it, the resulting mixture wa stirred at 5° C. for 45 minutes and then at 30° C. for 45 minutes, after which the solid matter was thrice washed with each 100 ml portion of heptane and dried under reduced pressure to obtain 29.8 g of a brown colored solid product.

(B) Synthesis of Solid Catalyst Component

After replacing inner atmosphere of a flask having a capacity of 100 ml with argon gas, 9.0 g of the solid product synthesized in the reduction (A), 45.0 ml of toluene and 2.5 ml (9.5 millimoles) of diisobutyl phthalate were charged into the flask and reacted at 95° C. for 30 minutes.

After the reaction, solid matter was separated from liquid and twice washed with each 30 ml portion of toluene.

After washing it, 30.0 ml of toluene, 0.19 ml (0.64 millimole) of butyl ether and 2.7 ml (25 millimoles) of titanium tetrachloride were added and reacted at 95° C. for 3 hours. After the reaction, solid matter was separated from liquid at 95° C., washed at that temperature twice with each 30 ml portion of toluene, further washed twice with each 30 ml portion of heptane, and dried under reduced pressure to obtain 28.1 g of a red-brown colored solid.

Composition of the catalyst component contained in the organic porous polymer carrier was as follows:

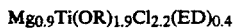

$Mg_{0.9}Ti(OR)_{1.9}Cl_{2.2}(ED)_{0.4}$

(C) Polymerization

A polymerization was carried out in the same manner as in Example 1 (D), except that 4.2 mg of the above-mentioned solid catalyst was used as catalyst component.

As the result, 64.0 g of a polymer was obtained. Catalyst activity was 270,000 g polymer/g titanium atom which was much lower than that in Example 1.

COMPARATIVE EXAMPLE 3

(A) Synthesis of Solid Catalyst Component

After replacing inner atmosphere of a flask having a capacity of 100 ml with argon gas, 8.3 g of the solid product obtained in Example 1 (B), 45 ml of toluene, 0.2 ml (1.2 millimoles) of butyl ether and 2.5 ml (22.7 millimoles) of titanium tetrachloride were charged into the flask and reacted at 95° C. for 3 hours. After the reaction, solid matter was separated from liquid at 95° C., twice washed at that temperature with each 50 ml portion of toluene, further washed twice with each 50 ml portion of hexane, and dried under reduced pressure to obtain 8.5 g of a brown colored solid catalyst component.

Composition of the catalyst component contained in the organic porous polymer carrier was as follows:

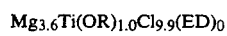

$Mg_{3.6}Ti(OR)_{1.0}Cl_{9.9}(ED)_0$

(B) Polymerization

A polymerization was carried out in the same manner as in Example 1 (D), except that 5.7 mg of the above-mentioned solid catalyst was used as catalyst component. As the result, 103 g of a polymer was obtained.

There was found an adhesion of polymer onto the inner wall and stirrer of the autoclave. Catalyst activity was 450,000 g polymer/g titanium atom. Density of this polymer was 0.918, its MI was 1.72 g/10 minutes, its MFR was 33.1, and its bulk density was 0.41 g/cm$^3$. Its CXS was 15.9%.

As compared with the polymer obtained in Example 1, this polymer was broader in molecular weight distribution and larger in the quantity of low molecular weight product.

COMPARATIVE EXAMPLE 4

(A) Synthesis of Solid Product

After replacing inner atmosphere of a flask having a capacity of 300 ml and equipped with a stirrer and a dropping funnel with argon gas, 200 ml of heptane, 2.5 g (7.4 millimoles) of tetrabutoxytitanium and 26.0 g (125 millimoles) of tetraethoxysilane were charged into the flask. They were made into a uniform solution and stirred at room temperature for 30 minutes. Then, 66.7 ml of the organomagnesium compound synthesized in Example 1 (A) was slowly dropped from the dropping funnel over a period of one hour, while maintaining the inner temperature of the flask at 5° C. After dropping it, the resulting mixture was stirred at room temperature for one hour. The solid matter was separated from liquid, thrice washed with each 200 ml portion of heptane and dried under reduced pressure to obtain 21.5 g of a brown colored solid product.

(B) Synthesis of Solid Catalyst Component

After replacing inner atmosphere of a flask having a capacity of 200 ml with argon gas, 13.8 g of the solid product synthesized in the reduction (A), 69 ml of toluene and 10.1 ml (37.7 millimoles) of diisobutyl phthalate were charged into the flask and reacted at 95° C. for one hour.

After the reaction, solid matter was separated from liquid, and twice washed with each 69 ml portion of toluene.

After washing it, 69 ml of toluene, 1.0 ml (6 millimoles) of butyl ether and 13.6 ml (124 millimoles) of titanium tetrachloride were added and reacted at 95° C. for 3 hours. After the reaction, the solid matter was separated from liquid at 95° C., twice washed at that temperature with each 69 ml portion of toluene and further washed twice with each 69 ml portion of n-heptane, and dried under reduced pressure to obtain 10.4 g of a brown colored solid catalyst component.

(C) Polymerization

Using the above-mentioned solid catalyst, a polymerization was carried out in the same manner as in Example 1 (D).

Since in this run the solid catalyst component was not impregnated into porous polymer carrier, particle characteristics of product were not good. When the autoclave was opened and its inside was examined, a part of polymer particle was adherent to the stirrer, etc. Further, the product contained 1.5% by weight of fine polymer having a particle size of 125 microns or below.

EXAMPLE 2

(A) Preliminary Polymerization of Solid Catalyst Component

After replacing inner atmosphere of a flask having a capacity of one liter and equipped with a stirrer with argon gas, 3.8 g of the solid catalyst component obtained in Example 1 (C), 500 ml of butane and 2.5 millimoles of triethylaluminum were charged into the flask. Then, hydrogen gas was introduced until the pressure reached 1 kg/cm$^2$ gage. Then, while feeding ethylene at a rate of 6 g/g solid catalyst-hour, a reaction was continued for a period of 3 hours. After the reaction, the butane was purged, and there was obtained 72.2 g of a preliminary polymerization catalyst. This catalyst contained 270 ppm of titanium atom.

(B) Polymerization

Using the solid catalyst component prepared above in a fluidized bed type gas phase polymerization reactor, a random copolymerization of ethylene and butene-1 was carried out.

After heating the polymerization reactor to 85° C., 300 g of a high density polyethylene powder which had previously been dried under reduced pressure was added as a dispersant, and thereafter 5.34 g of triethylaluminum and 0.22 g of the solid catalyst component prepared above were charged into the reactor while applying a pressure of a small quantity of hexane. A gaseous mixture consisting of ethylene, butene-1 and hydrogen which had been prepared so as to have an ethylene/butene-1/hydrogen molar ratio of 69/24/7 was circulated at a flow rate of 0.3 m/second as measured in the polymerization reactor at a pressure of 9 to 9.5 kg/cm$^2$G. When ethylene/butene-1/hydrogen ratio deviated from the predetermined value, the necessary component was additionally added to adjust the molar ratio. Under such a condition, a fluidized bed gas phase copolymerization was carried out for 2 hours so that the polymer height/reactor diameter ratio (l/d) in the polymerization reactor retained a value of 2–4. After the polymerization, a quantity, comparable to the amount of resulting polymer, of polymer was withdrawn from the reactor, and the polymer remaining in the reactor was used as a dispersant for the next run. By repeating the above-mentioned procedure six times, the proportion of the initially fed high density polyethylene powder in the polymer became negligible small.

After the polymerization, the polymer was recovered, from which catalyst activity was determined. As the result, the catalyst activity was 1,540,000 g polymer/g titanium atom. Density of this polymer was 0.921, its MI was 1.15 g/10 minutes, its MFR was 27.0, its bulk density was 0.46 g/cm$^3$, and its CXS was 6.2%. Similarly to Example 1, the formed polymer had good particle characteristics, and adhesion to reactor wall was hardly observable.

EXAMPLE 3

(A) Synthesis of Solid Catalyst Component

After replacing inner atmosphere of a flask having a capacity of 100 ml with argon gas, 8.2 g of the solid product synthesized in reduction of Example 1 (B), 27.3 ml of toluene and 1.2 ml (4.3 millimoles) of diisobutyl phthalate were charged into the flask and reacted at 95° C. for 30 minutes.

After the reaction, solid matter was separated from liquid and twice washed with each 40 ml portion of toluene.

After washing it, 40 ml of toluene, 0.1 ml (0.4 millimole) of diisobutyl phthalate, 0.3 ml (1.8 millimoles) of butyl ether and 4.9 ml (45 millimoles) of titanium tetrachloride were added to the flask and reacted at 95° C. for 3 hours. After the reaction, the solid matter was separated from liquid at 95° C., and washed twice with each 50 ml portion of toluene at that temperature.

Further, it was twice washed with each 50 ml portion of hexane and dried under reduced pressure to obtain 8.0 g of a brown colored solid catalyst component.

Composition of the catalyst component contained in the organic porous polymer carrier was as follows:

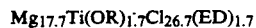

$$Mg_{17.7}Ti(OR)_{1.7}Cl_{26.7}(ED)_{1.7}$$

(B) Preliminary Polymerization of Solid Catalyst Component

After replacing inner atmosphere of a flask having a capacity of one liter and equipped with a stirrer with argon gas, 3.8 g of the solid catalyst component obtained in (A), 500 ml of butane, 2.5 millimoles of triethylaluminum and 0.38 millimole of iso-butyltriethoxysilane were charged. While continuously feeding propylene at a rate of 6 g/g solid catalyst-hour, a reaction was continued for 4 hours. After the reaction, the butane was purged and there was obtained 72.3 g of a preliminary polymerization catalyst. It contained 262 ppm of titanium atom.

(C) Polymerization

Using the solid catalyst component prepared above a polymerization was carried out in the same manner as in Example 2 (B), except that ethylene/butene-1/hydrogen molar ratio was altered to 65/23/12.

The catalyst activity was 720,000 g polymer/g titanium atom. Density of this polymer was 0.920, its MI was 0.71 g/10 minutes, its MFR was 26.8, its bulk density was 0.45 g/cm$^3$, and its CXS was 8.1%.

Similarly to Example 1, the formed polymer had good particle characteristics, and adhesion to reactor wall was hardly observable.

COMPARATIVE EXAMPLE 5

(A) Synthesis of Solid Catalyst Component

After replacing inner atmosphere of a flask having a capacity of 100 ml with argon gas, 6.1 g of the solid product synthesized in the reduction of Example 1 (B), 30 ml of toluene, 0.7 ml (2.5 millimoles) of diisobutyl phthalate, 2.6 ml (15.4 millimoles) of butyl ether and 36.6 ml (333 millimoles) of titanium tetrachloride were charged into the flask and reacted at 95° C. for 3 hours. After the reaction, solid matter was separated from liquid at 95° C. and twice washed with each 50 ml portion of toluene at that temperature.

Further, it was washed twice with each 50 ml portion of hexane and dried under reduced pressure to obtain 6.2 g of a brown colored solid catalyst component.

Composition of the catalyst component contained in the organic porous polymer carrier was as follows:

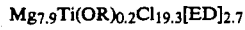

$$Mg_{7.9}Ti(OR)_{0.2}Cl_{19.3}[ED]_{2.7}$$

(B) Preliminary Polymerization of Solid Catalyst Component

A preliminary polymerization of propylene was carried out in the same manner as in Example 3 (B), except that 3.2 g of the catalyst obtained in (A) was used. As the result, 57.6 g of a preliminary polymerization catalyst was obtained. It contained 830 ppm of titanium atom.

(C) Polymerization

A polymerization was carried out in the same manner as in Example 3 (C), except that the solid catalyst component prepared above was used.

The catalyst activity was 230,000 g polymer/g titanium atom. Density of this polymer was 0.920, its MI was 0.77 g/10 minutes, its MFR was 30, its bulk density was 0.43 g/cm$^3$, and its CXS was 9.1%.

This catalyst was lower than that of Example 3 in catalyst activity.

EXAMPLE 4

A polymerization was carried out in the same manner as in Example 2 (B), except that the composition (molar ratio ethylene/butene-1/hydrogen) of gas mixture was 75/18/7.

The catalyst activity was 780,000 g polymer/g titanium atom. Density of this polymer was 0.927, its MI was 2.21 g/10 minutes, its MFR was 27.1, its bulk density was 0.45 g/cm$^3$, and its CXS was 3.7%.

The polymer thus obtained had good particle characteristics, a narrow molecular weight distribution and a small content of low molecular weight component.

EXAMPLE 5

A polymerization was carried out in the same manner as in Example 2 (B), except that the gaseous mixture had a composition (molar ratio ethylene/butene-1/ hydrogen) of 60/34/6.

The catalyst activity was 620,000 g polymer/g titanium atom. Density of this polymer was 0.911, its MI was 1.20 g/10 minutes, its MFR was 27.5, and its bulk density was 0.42 g/cm$^3$.

Although it was an ultra-low density polymer, its particle characteristics were good, and its molecular weight distribution was narrow.

What is claimed is:

1. An olefin polymerization catalyst comprising:
   (A) a solid catalyst component containing a trivalent titanium, which is represented by the composition formula

$Mg_mTi(OR)_nX_p[ED]_q$ (wherein R is a hydrocarbon group having 1 to 20 carbon atoms, X is a halogen, ED is an electron donative compound, and m, n, p and q are each a number satisfying $1 \leq m \leq 51$, $0 < n \leq 5$, $5 \leq p \leq 106$ and $0.2 \leq q \leq 2$) obtained by reducing a titanium compound represented by the general formula $Ti(OR^1)_aX_{4-a}$ (wherein $R^1$ is a hydrocarbon group having 1 to 20 carbon atoms, X is a halogen atom and a is a number satisfying $0 < a \leq 4$) with an organomagnesium compound in the presence of an organic silicon compound having Si-O bonds which is represented by the general formula $Si(OR^3)_bR^4_{4-b}$, $R^5(R^6_2SiO)_cSiR^7$ or $(R^8_2SiO)_d$ (wherein $R^3$ is a hydrocarbon group having 1 to 20 carbon atoms, $R^4$, $R^5$, $R^6$, $R^7$ and $R^8$ are each a hydrocarbon group having 1 to 20 carbon atoms or hydrogen atom, b is a number satisfying $0 < b \leq 4$, c is an integer of 1 to 1000 and d is an integer of 2 to 1000) and an organic porous polymer, treating the resulting solid product with a carboxylic acid ester compound and then reacting it with titanium tetrachloride or a mixture of titanium tetrachloride and an electron donative compound, and
   (B) an organoaluminum compound.

2. A solid catalyst component according to claim 1, wherein the $R^1$ of the titanium compound represented by the general formula $Ti(OR^1)_aX_{4-a}$ is a linear alkyl group having 2 to 18 carbon atoms.

3. A solid catalyst component according to claim 1, wherein the a of the titanium compound represented by the general formula $Ti(OR^1)_aX_{4-a}$ is a number satisfying $2 \leq a \leq 4$.

4. A solid catalyst component according to claim 1, wherein the X of the titanium compound represented by the general formula $Ti(OR^1)_aX_{4-a}$ is chlorine.

5. A solid catalyst component according to claim 1, wherein the b is of the organic silicon compound represented by the general formula $Si(OR^3)_bR^4_{4-b}$ is a number satisfying $1 < b \leq 4$.

6. A solid catalyst component according to claim 1, wherein the organomagnesium compound is a Grignard compound represented by the general formula $R^9MgX$ (wherein $R^9$ is a hydrocarbon group having 1 to 20 carbon atoms and X is a halogen atom), or dialkylmagnesium compound or diarylmagnesium compound represented by the general formula $R^{10}R^{11}Mg$ (wherein $R^{10}$ and $R^{11}$ are each a hydrocarbon group having 1 to 20 carbon atoms).

7. A solid catalyst component according to claim 1, wherein the organic porous polymer is polystyrene, styrene-divinylbenzene copolymer or polyvinyl chloride.

8. A solid catalyst component according to claim 7, wherein the organic porous polymer have a mean particle diameter of 5 to 1,000 microns and a pore volume of 0.1 cc/g or above at a pore radius of 100 to 5,000 angstroms.

9. A solid catalyst component according to claim 1, wherein the carboxylic acid ester compound is an aliphatic carboxylic acid ester, an olefinic carboxylic acid ester, an alicyclic carboxylic acid ester or an aromatic carboxylic acid ester.

10. A solid catalyst component according to claim 1, wherein the electron donative compound is an ester compound, an ether compound or a ketone compound.

11. A solid catalyst component according to claim 10, wherein the ester compound is an aliphatic carboxylic acid ester, an olefinic carboxylic acid ester, an alicyclic carboxylic acid ester or an aromatic carboxylic acid ester.

12. A solid catalyst component according to claim 1, wherein the organic silicon compound is used in an amount of 1 to 50 in term of atomic ratio of silicon atom to titanium atom (Si/Ti).

13. A solid catalyst component according to claim 1, wherein the organomagnesium compound is used in an amount of 0.1 to 10 in term of atomic ratio of the sum of titanium atom and silicon atom to magnesium atom (Si+Ti/Mg).

14. A solid catalyst component according to claim 1, wherein the reduction is conducted at a temperature of −50° to 70° C.

15. A solid catalyst component according to claim 1, wherein the organic porous polymer is used in an amount of 20 to 90% by weight in terms of proportion in solid product.

16. A solid catalyst component according to claim 1, wherein the ester compound is used in an amount of 0.1 to 50 moles per 1 mol of titanium atom in solid product and in an amount of 0.01 to 1.0 mole per 1 mol of magnesium atom in solid product.

17. A solid catalyst component according to claim 1, wherein titanium tetrachloride is used in an amount of 1 to 1000 moles per 1 mol of titanium atom in solid product.

18. An olefin polymerization catalyst according to claim 1, wherein the organoaluminum compound is a compound having at least one Al-C bond within the molecule and represented by the general formula $R^{12}_\gamma AlY_{3-\gamma}$ or $R^{13}R^{14}Al\text{-}O\text{-}AlR^{15}R^{16}$ (wherein $R^{12}$, $R^{13}$, $R^{14}$, $R^{15}$ and $R^{16}$ are each a hydrocarbon group having 1 to 8 carbon atoms, Y is halogen atom, hydrogen atom or alkoxy group and $\gamma$ is a number of satisfying $2 \leq \gamma \leq 3$).

19. An olefin polymerization catalyst according to claim 18, wherein the organoaluminum compound is a trialkylaluminum, a mixture of a trialkylaluminum and a dialkylaluminum halide, or alkylalumoxane.

20. An olefin polymerization catalyst according to claim 1, wherein the organoaluminum compound is used in an amount of 1 to 1000 moles per 1 mol of titanium atom in solid product.

* * * * *